United States Patent
Oberg et al.

(10) Patent No.: US 6,311,676 B1
(45) Date of Patent: Nov. 6, 2001

(54) INTERCOOLER ARRANGEMENT FOR A MOTOR VEHICLE ENGINE

(75) Inventors: Erik J. Oberg, Ann Arbor; Robert P. Woodard, Brighton, both of MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/429,172

(22) Filed: Oct. 28, 1999

(51) Int. Cl.⁷ .................................................. F02B 33/00
(52) U.S. Cl. ...................... 123/563; 60/599; 165/51; 165/154; 165/164; 165/153
(58) Field of Search ..................... 60/599; 123/563; 165/51, 154, 164, 153

(56) References Cited

U.S. PATENT DOCUMENTS

| | | | |
|---|---|---|---|
| 3,187,810 | * | 6/1965 | Helin et al. ............................. 165/158 |
| 4,436,145 | * | 3/1984 | Manfredo et al. .................... 123/563 |
| 4,565,177 | * | 1/1986 | Roettgen et al. ...................... 123/563 |
| 4,648,355 | * | 3/1987 | Bekedam ............................... 165/154 |
| 4,693,084 | * | 9/1987 | Ahrens .................................. 123/563 |
| 4,805,693 | * | 2/1989 | Flessate ................................. 165/153 |
| 4,823,868 | * | 4/1989 | Neebel .................................. 123/563 |
| 4,878,460 | * | 11/1989 | Uchida et al. ........................ 123/563 |
| 5,406,910 | * | 4/1995 | Wallin ..................................... 165/51 |
| 5,662,083 | | 9/1997 | Patyi . |

FOREIGN PATENT DOCUMENTS

| | | | |
|---|---|---|---|
| 2231142A | * | 11/1990 | (GB) ..................................... 165/154 |
| 403134229A | * | 6/1991 | (JP) ...................................... 123/536 |

OTHER PUBLICATIONS

Laminova brochure, copyright 1995, 8 pgs.

* cited by examiner

*Primary Examiner*—Thomas Denion
*Assistant Examiner*—Thai-Ba Trieu
(74) *Attorney, Agent, or Firm*—Mark P. Calcaterra (57) ABSTRACT

An arrangement for cooling the temperature of a source of air prior to introduction into a motor vehicle engine includes an intercooler core and an intercooler housing. The intercooler core has a generally cylindrical shape. The intercooler housing defines an inner chamber receiving the intercooler core. The intercooler housing has an intake side with at least one intake port in communication with the intercooler core and an outlet side with at least one outlet port in communication with the intercooler core. The intake side and the outlet side are spaced apart and parallel.

18 Claims, 7 Drawing Sheets

INTERCOOLER ARRANGEMENT FOR A MOTOR VEHICLE ENGINE

BACKGROUND OF THE INVENTION

1. Technical Field

The present invention generally pertains to motor vehicles. More particular, the present invention pertains to an intercooler arrangement for a turbocharged motor vehicle engine.

2. Discussion

The term "supercharging" refers to increasing the air or air/fuel mixture density of a motor vehicle engine by increasing its pressure prior to entering the engine cylinder. One method of increasing the pressure is by mechanical supercharging where a separate pump, blower or compressor provides the compressed air. The pump, blower or compressor is usually driven by power taken from the engine. A second method of increasing the pressure is turbocharging, where a turbocharger is used to boost inlet air or air/fuel mixture density. The turbocharger typically consists of a compressor and turbine on a single shaft. Energy available in the engine's exhaust stream is used to drive the turbocharger turbine which in turn drives the turbocharger compressor to raise the inlet fluid density prior to entry to the engine cylinders.

The power developed by an internal combustion engine is largely dependent on the amount of combustible mixture reaching the cylinders. The design of manifolds, carburetors, fuel injectors, the size of valves and the size of valve ports are all important factors in determining the amount of this mixture. To overcome friction losses in the intake system and to aid in scavengering the cylinders of burned gases, supercharging can be used to force the combustible mixture into the cylinders.

Compressed air forced into a cylinder is pressurized. Since pressure is directly related to heat, this increase in pressure functions to heat the air. It is desirable to cool down this compressed air before it is introduced into the intake manifold. The cool compressed air is packed tighter together in the cylinder than if it had not been cooled. As a result, more power is created when this air-fuel mixture explodes. This function is frequently accomplished with an intercooler.

While known intercooler arrangements have proven to be effective in cooling compressed air delivered to an engine cylinder, they nevertheless can be subject of certain improvements. In this regard, conventional intercooler arrangements are often larger structures which cause packaging concerns. Thus, it would be advantageous to provide an intercooler arrangement, including a core and core housing of compact construction which reduces packaging concerns.

SUMMARY OF THE INVENTION

It is a general object of the present invention to provide an improved intercooler arrangement for a motor vehicle.

It is another object of the present invention to provide an intercooler arrangement having a core and core housing of compact construction.

It is another object of the present invention to provide a core housing for an intercooler core which improves air flow and efficiency of the core to reduce the temperature of air passing by the core.

In one form, the present invention provides an arrangement for cooling the temperature of a source of air prior to introduction into a motor vehicle engine. The arrangement includes an intercooler core and an intercooler housing. The intercooler core has a generally cylindrical shape. The intercooler housing defines an inner chamber receiving the intercooler core. The intercooler housing has an intake side with at least one intake port in communication with the intercooler core and an outlet side with at least one outlet port in communication with the intercooler core. The intake side and the outlet side are spaced apart and parallel.

In another form, the present invention provides an arrangement for cooling the temperature of a source of air prior to introduction into a motor vehicle engine including a main body portion and an intercooler core. The main body portion is integrally formed to include a first end adapted to be interconnected with a turbocharger of the motor vehicle and a second end adapted to be interconnected to the engine. The main body portion defines a generally cylindrical opening extending therethrough along an axis. The cylindrical opening is in fluid communication with the first end through at least one intake port and in fluid communication with the second end through at least one outlet port. The intercooler core is generally cylindrical and disposed in the cylindrical opening.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENTS

Figure 1:
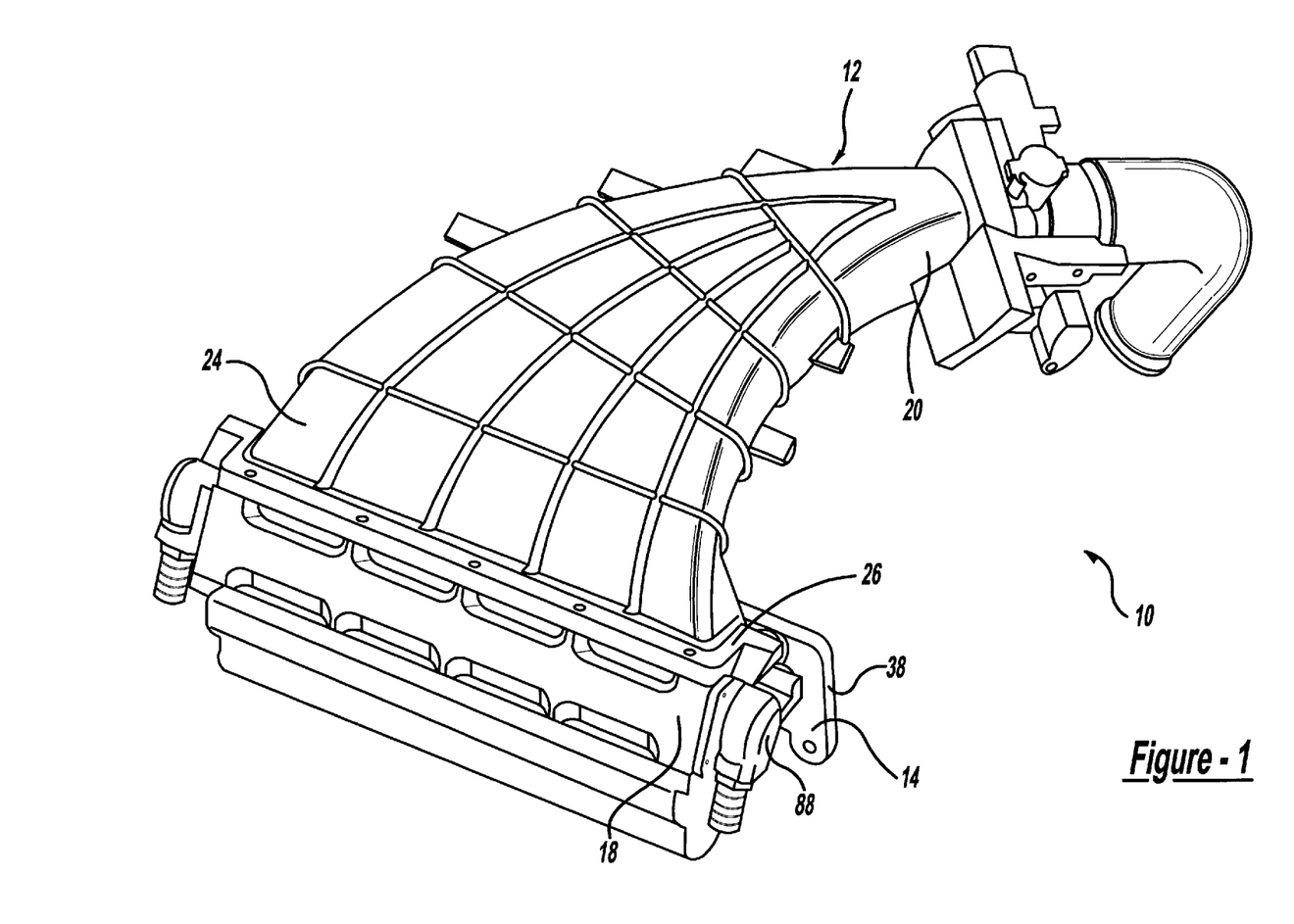
FIG. 1 is a perspective view of an intercooler arrangement for a motor vehicle constructed in accordance with the teachings of a first preferred embodiment of the present invention.
Figure 2:
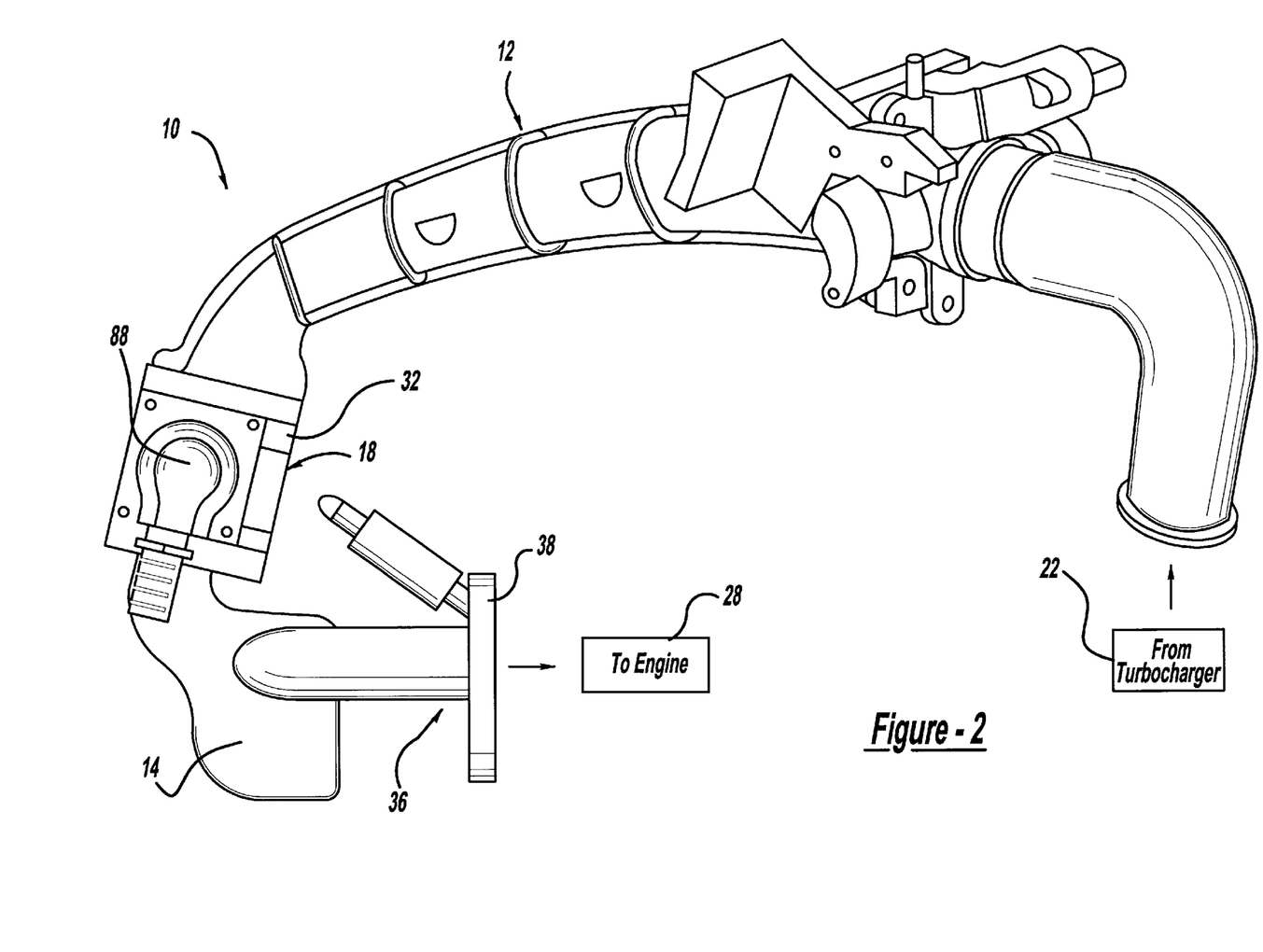
FIG. 2 is a side view of the intercooler of FIG. 1.
Figure 3:
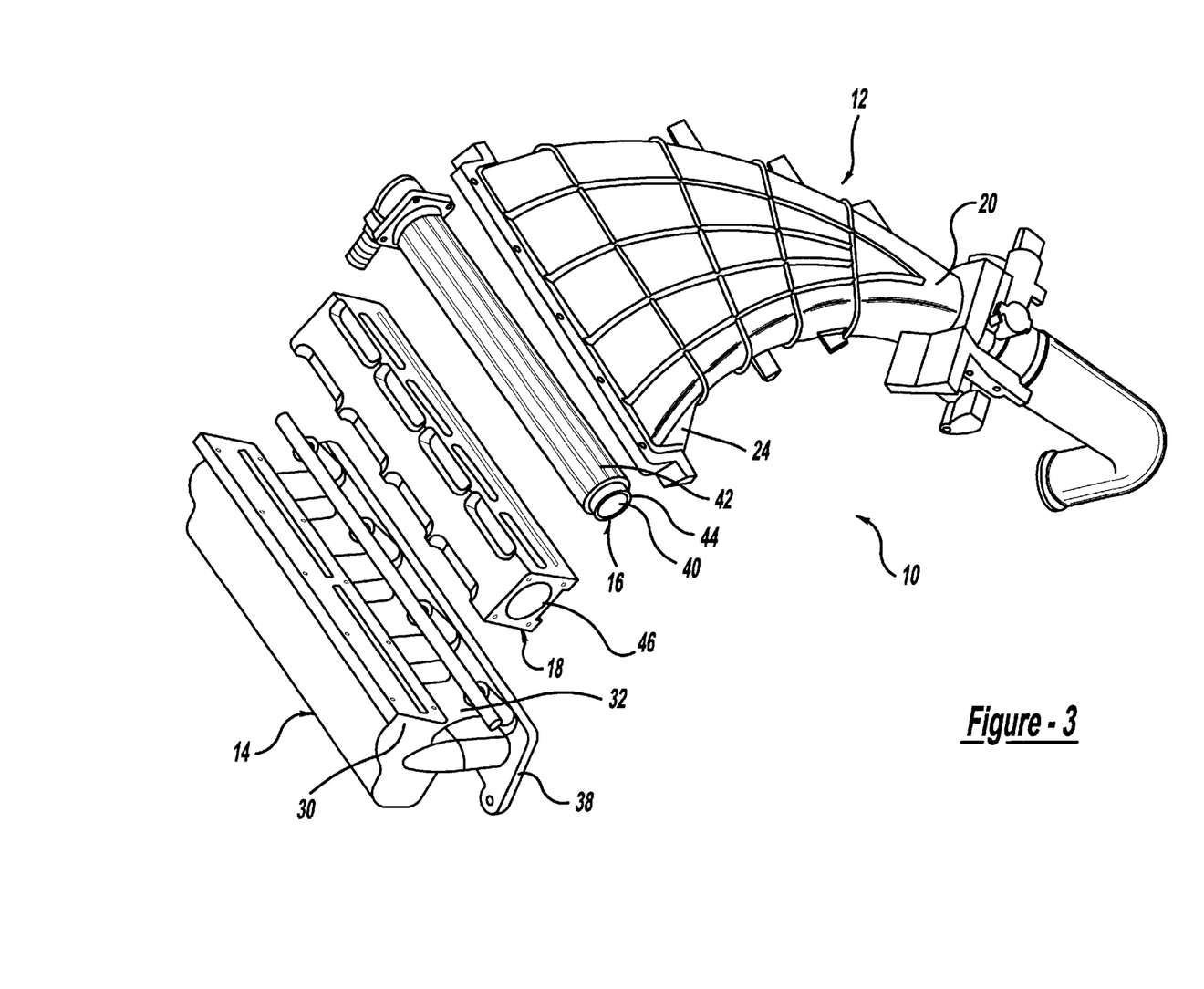
FIG. 3 is an exploded perspective view of the intercooler of FIG. 1.
Figure 4:
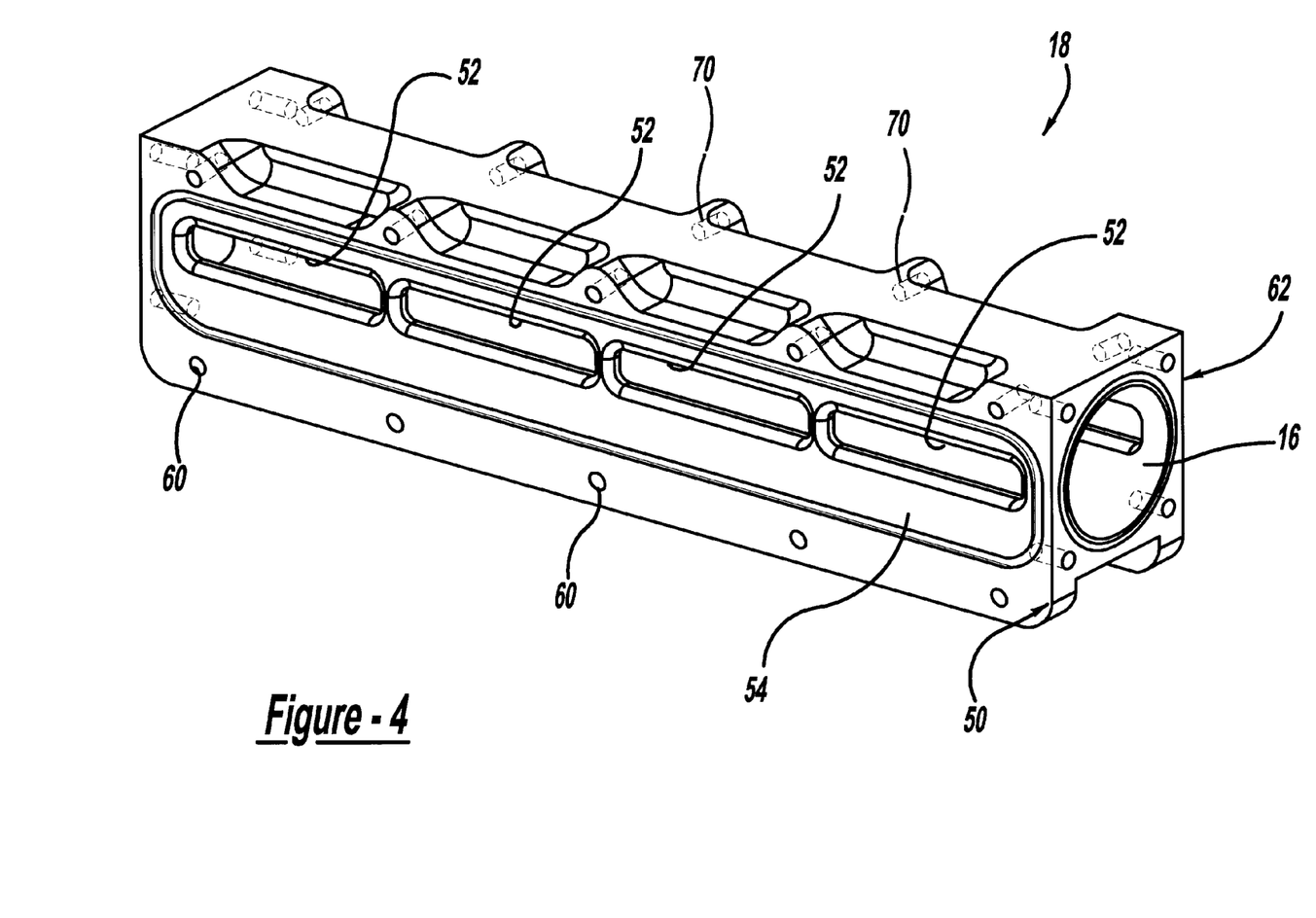
FIG. 4 is an enlarged perspective view of the core housing of FIG. 1.
Figures 5, 6, 7, 8:
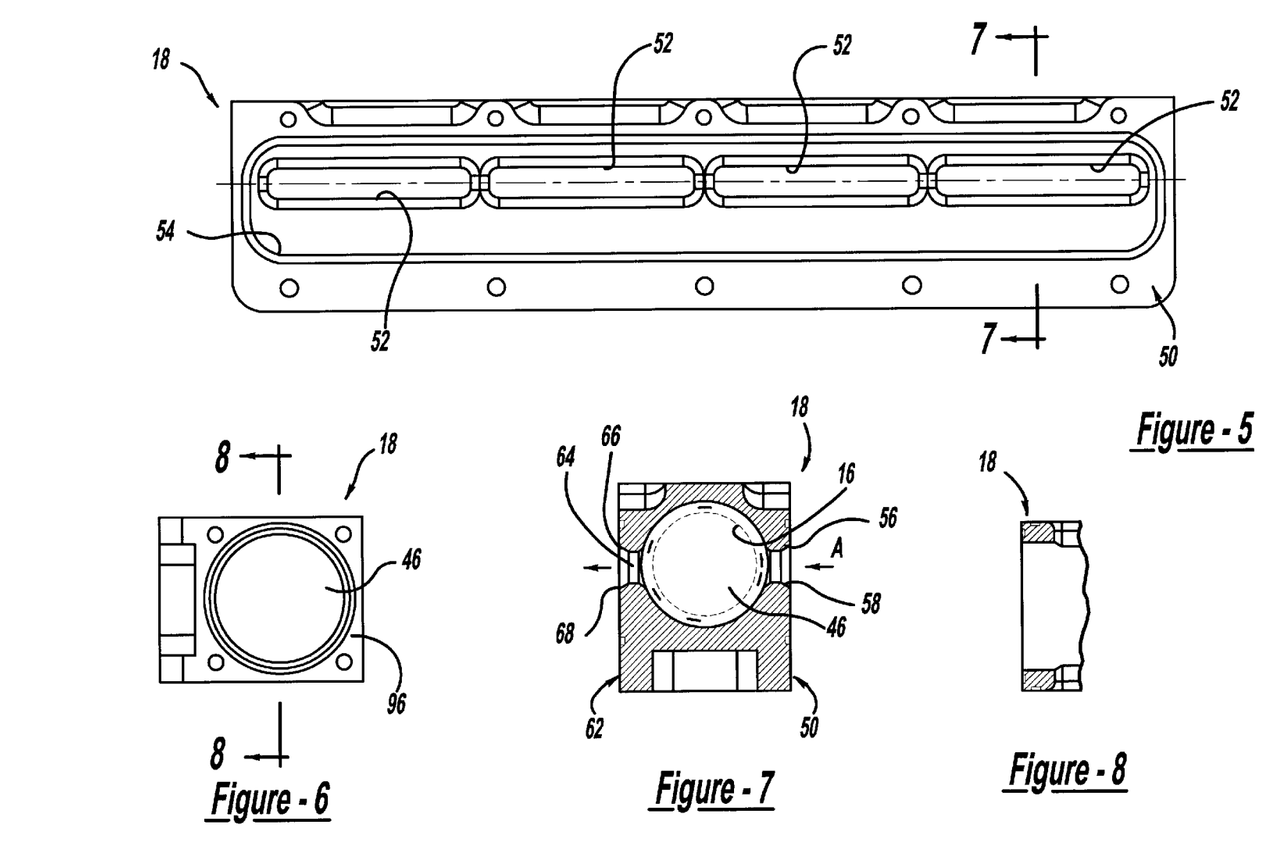
FIG. 5 is a side view of the core housing of FIG. 4.
FIG. 6 is an end view of the core housing of FIG. 5.
FIG. 7 is a cross-sectional view taken along the line 7—7 of FIG. 5.
FIG. 8 is a cross-sectional view taken along the line 8—8 of FIG. 6.

With general reference to FIGS. 1–3 of the drawings and intercooler arrangement constructed in accordance with the teachings of a first preferred embodiment of the present invention is shown and generally identified at reference numeral 10. It will be understood that the arrangement 10 illustrated in the drawings is one exemplary use employing the teachings of the present invention. In this regard, variations from the arrangement shown in FIGS. 1–3 are anticipated and shall be considered to be within the scope of the present invention.

The intercooler arrangement 10 is illustrated to generally include an air intake member or upper intake casting 12, an air outlet member or lower intake casting 14, and intercooler core 16 and an intercooler housing 18. Insofar as the first preferred embodiment of the present invention is concerned, much of the focus is directed to the packaging and operational efficiencies provided by the intercooler core 16 and the intercooler core housing 18. These aspects of the present invention will be addressed below.

The upper intake casting 12 provides an air passageway for delivering a source of compressed air to the intercooler housing 18 and core 16. The upper intake casting 12 includes a first end 20 for receiving the source of air from the turbocharger 22 and a second end 24 for delivering the source of air to the intercooler housing 18 and core 16. It will be understood that the manner of attachment of the intake casting 12 to the turbocharger 22 is conventional in nature and beyond the scope of the present invention. The upper intake casting 12 is generally hollow and significantly widens as it progresses from the turbocharger 22 to the intercooler housing 18. A mounting flange 26 is provided which is secured to the intercooler housing 18 in a manner described below. In the exemplary embodiment, a throttle body is disposed between the turbocharger 22 and the intercooler core 16 and housing 18. In other arrangement§, the turbocharger 22 may be disposed between the throttle body and the intercooler core 16 and housing 18.

The lower intake casting 14 provides an air passageway for delivering the source of compressed air from the intercooler housing 18 to the engine 28. The upper intake casting 12 includes a first end 30 including a mounting flange 32 which is secured to the intercooler housing 18 in a manner described below. The first end 30 is shown in FIG. 3 to define a pair of elongated openings 34 for receiving the source of compressed air from the intercooler housing 18. The lower intake casting 14 further includes a second end 36 for attachment to the engine 28. The second end 36 includes a flange 38 for bolting to the engine 18 in an otherwise conventional manner.

The intercooler core 16 of the present invention is shown particularly in FIG. 3 to have a generally cylindrical shape. In the embodiment illustrated, the intercooler core 16 is hollow for purposes of weight reduction. The hollow center 40, however, is preferably plugged (not shown) to prevent the passage of fluid therethrough. The outer surface of the intercooler core 16 includes a plurality of heat exchanging ribs or fins 42 aligned in radially extending rows and axially extending columns. The intercooler core 16 includes a plurality of axially extending holes 44 through which water is permitted to pass for extracting heat from the ribs 42. The manner in which water is circulated to the intercooler core with the present invention is discussed below. One suitable core is commercially available from Laminova of Sweden.

With continued reference to FIGS. 1 through 3 and additional reference to FIGS. 4 through 8, the intercooler housing 18 of the present invention is shown to have a generally cuboid shape. The intercooler housing 18 defines a cylindrical inner chamber 46 receiving the intercooler core 12. The cylindrical inner chamber 46 is only substantially greater in diameter that the intercooler core 16.

The intercooler housing 18 includes a first side or intake side 50 for receiving the source of compressed air from the upper intake casting 12. The first side 50 includes at least one intake port 62. In the exemplary embodiment illustrated, the first side 50 is shown to include four substantially identical intake ports 52 in fluid communication with the inner chamber 46. The intake ports operate to introduce the compressed air to the intercooler core 16 (see for example the cross-section view of FIG. 7) in a direction of Arrows A. Each of the intake ports 52 is shown disposed within a common recess 54. The intake ports 52 include opposing longitudinal walls 56 and 58 which taper together as they enter the housing 18 and diverge apart as they continue toward the inner chamber 46. The intake ports 52 preferably extend radially with respect to the cylindrical inner chamber 46.

The intake side 50 defines a mounting flange for securement to the upper intake casting 12. A plurality of apertures 60 are provided for receiving bolts (not specifically shown) which engage aligning apertures (not shown) provided in the upper intake casting 12. Alternatively, it will be understood that the housing 18 and the upper intake casting 12 may be welded or otherwise suitably secured.

The intercooler housing 18 is similarly formed to include a second side or outlet side 62 for transferring the source of compressed air from the inner chamber 46 to the lower intake casting 18. The second side 62 is substantially identical to the first side 50 and includes at least one outlet port 64. In the exemplary embodiment, the second side 62 is includes four substantially identical outlet ports 64 in fluid communication with the inner chamber 46. Again, each of the outlet ports 64 is disposed within a common recess (not shown). The outlet ports 64 include opposing longitudinal walls 66 and 68 which taper together as they enter the housing 18 and diverge apart as they continue toward the inner chamber 46. The outlet ports 64 preferably extend radially with respect to the cylindrical inner chamber 46.

The outlet side 62 defines a mounting flange for securement to the lower intake casting 18. A plurality of apertures 70 are provided for receiving bolts (not specifically shown) which engage aligning apertures (not shown) provided in the upper intake casting 12. Alternatively, it will be understood that the housing 18 and the upper intake casting 12 may be welded or otherwise suitably secured.

Figure 11:
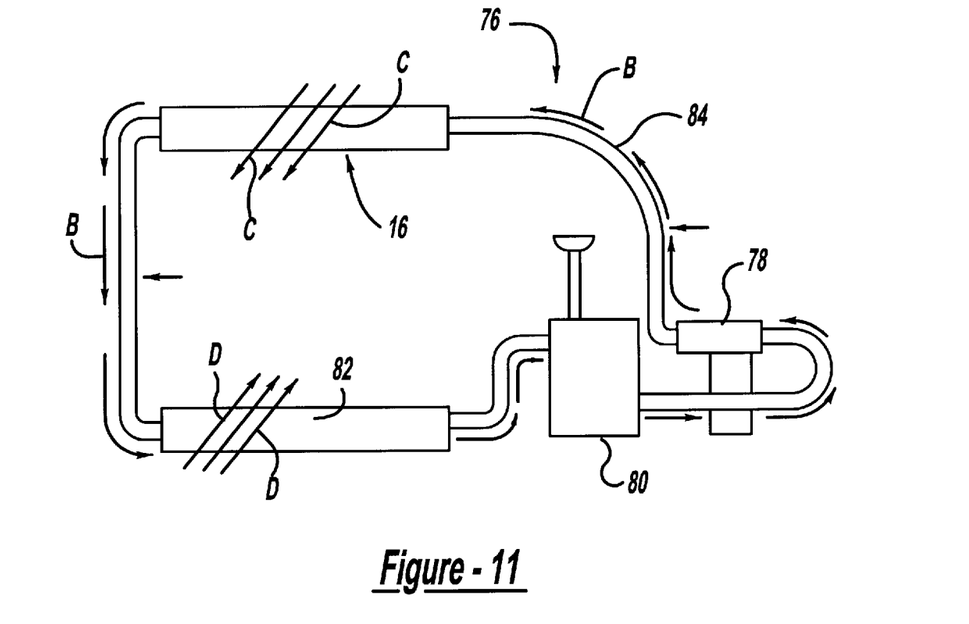
FIG. 11 is a schematic diagram of a plumbing layout of the intercooler of FIG. 1.

The intercooler arrangement of the present invention includes a dedicated water system. With reference to FIG. 11, an exemplary plumbing arrangement 76 for circulating a source of water to through the intercooler core 16 is schematically illustrated. The plumbing arrangement 76 includes a water pump 78, a water tank 80 and a heat exchanger 82. The components of the plumbing arrangement 76 are interconnected with a ⅝ inch hose 84. The source of water travels through the hose 84 in a direction of Arrow B. Arrows C represent charge air flow over the intercooler core 16, while Arrows D represent ambient air flow through the heat exchanger.

Figure 9:
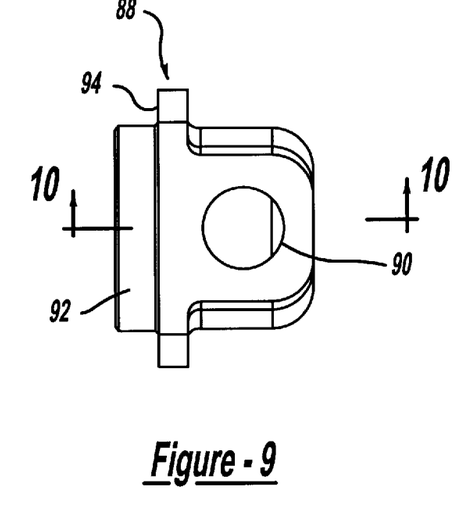
FIG. 9 is a bottom view of one of the end caps of the intercooler arrangement of FIG. 1.
Figure 10:
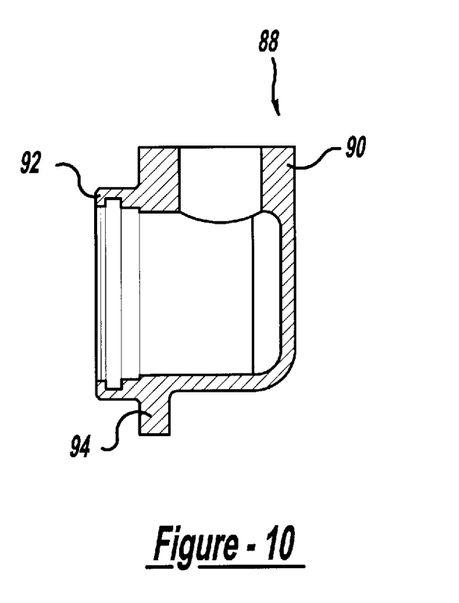
FIG. 10 is a cross-sectional view taken along the line 10—10 of FIG. 9.

With reference to FIGS. 1 through 3 and reference to FIGS. 9 and 10, the present invention is shown to include a pair of substantially identical couplings 88. Each coupling 88 includes a first end secured to the hose 84 and a second end secured to the intercooler core 16. The couplings 88 include a mounting flange 94 for bolting to one of the longitudinal ends 96 of the housing 18 with bolts (not shown).

The inlet and outlet ports 52 and 64 of the present invention are oriented to maximize the transfer of heat from the source of compressed air to the source of water. As shown in the cross-sectional view of FIG. 7, the source of air is radially introduced to the inner chamber 46, and thereby the intercooler core 16. Air flow is routed in both directions around the intercooler core 16 so as to maximize the number of ribs contact. As a result, the source of air contacts a maximum surface area for transferring the heat. This routing of the source of air is further facilitated by the radial orientation of the outlet ports 64.

Figure 12:
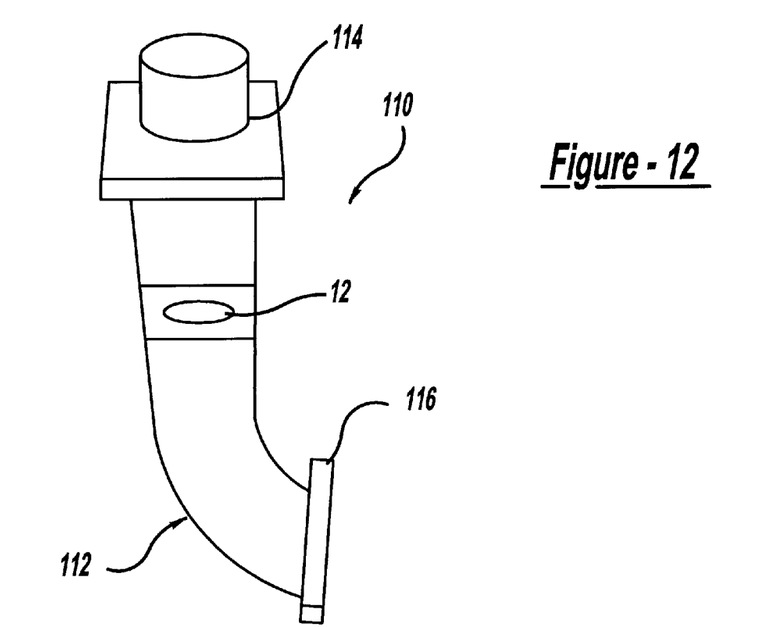
FIG. 12 is a side view of an intercooler arrangement for a motor vehicle constructed in accordance with the teachings of a second preferred embodiment of the present invention.
Figure 13:
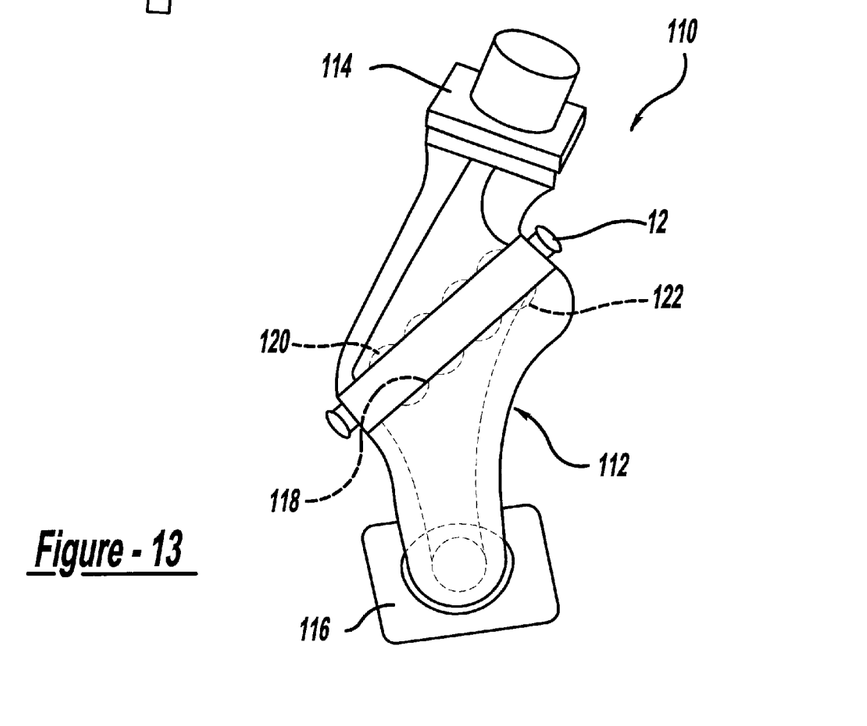
FIG. 13 is a top view of the intercooler arrangement of FIG. 12.

Turning now to FIGS. 12 and 13, a second preferred embodiment of an intercooler arrangement 110 constructed in accordance with the teachings of the present invention is illustrated. The intercooler arrangement 110 an intercooler core 12 which is identical to the first preferred embodiment 10. In contrast to the upper and lower intake members 12 and 14 of the first preferred embodiment, the second preferred embodiment includes an integrally formed main body portion 112. The main body portion 112 includes a first end 114 adapted to be interconnected with a turbocharger of the motor vehicle and a second end 116 adapted to be interconnected to the engine. The main body portion 112 defines a generally cylindrical opening 118. The cylindrical opening 118 is in fluid communication with the first end 114 through at least one intake port 120. The cylindrical opening 118 is in fluid communication with the second end 116 through at least one outlet port 122. The intercooler core 12 is disposed in the cylindrical opening 118.

As with the first preferred embodiment, it will be understood that the intake and outlet ports 120 and 122 of the intercooler arrangement 110 of the second preferred embodiment are disposed radially with respect to the cylindrical opening 118. Thus, the air flow advantages provided by the first preferred embodiment which are discussed above are common with the second preferred embodiment.

While the invention has been described in the specification and illustrated in the drawings with reference to preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims. In this regard, it will be understood that in certain applications it may be desirable to incorporate two or more intercooler cores 16 in parallel for further cooling of the source of compressed air.

What is claimed is:

1. An arrangement for cooling the temperature of a source of air prior to introduction into a motor vehicle engine, the arrangement comprising:
    an intercooler core having a generally cylindrical shape and defining an axis; and
    an intercooler housing defining an inner chamber receiving the intercooler core, the intercooler housing having an intake side with at least one intake port in communication with the intercooler core and an outlet side with at least one outlet port in communication with the intercooler core, the intake side and the outlet side being spaced apart, planar and parallel to the axis.

2. The arrangement for cooling the temperature of a source of air prior to introduction into a motor vehicle engine of claim 1, wherein said intercooler housing has a substantially cuboid shape.

3. The arrangement for cooling the temperature of a source of air prior to introduction into a motor vehicle engine of claim 2, wherein the inner chamber receiving the intercooler core has a generally cylindrical shape.

4. The arrangement for cooling the temperature of a source of air prior to introduction into a motor vehicle engine of claim 3, wherein the at least one intake port and the at least one outlet port radially extend from the inner chamber.

5. The arrangement for cooling the temperature of a source of air prior to introduction into a motor vehicle engine of claim 4, wherein the at least one intake port and the at least one outlet port are disposed on radially opposite sides of the inner chamber.

6. The arrangement for cooling the temperature of a source of air prior to introduction into a motor vehicle engine of claim 1, wherein the air intake side defines a first mounting flange adapted for attachment to an air intake member.

7. The arrangement for cooling the temperature of a source of air prior to introduction into a motor vehicle engine of claim 6, wherein the air outlet side defines a second flange adapted to be attached to an air outlet member.

8. The arrangement for cooling the temperature of a source of air prior to introduction into a motor vehicle engine of claim 1, wherein the innercooler core defines a plurality of holes extending in a direction substantially parallel to the axis for providing a water path through the innercooler core.

9. An arrangement for cooling the temperature of a source of air prior to introduction into a motor vehicle engine, the arrangement comprising:
    an intercooler core having a generally cylindrical shape and defining an axis;
    an intercooler housing defining an inner chamber receiving the intercooler core, the intercooler housing having an intake side with at least one intake port in communication with the intercooler core and an outlet side with at least one outlet port in communication with the intercooler core, the intake side and the outlet side being spaced apart, planar and parallel to the axis;
    an air intake member mounted to the air intake side; and
    an air outlet member mounted to the air outlet side.

10. The arrangement for cooling the temperature of a source of air prior to introduction into a motor vehicle engine of claim 9, wherein said intercooler housing has a substantially cuboid shape.

11. The arrangement for cooling the temperature of a source of air prior to introduction into a motor vehicle engine of claim 10, wherein the inner chamber receiving the intercooler core has a generally cylindrical shape.

12. The arrangement for cooling the temperature of a source of air prior to introduction into a motor vehicle engine of claim 11, wherein the at least one intake port and the at least one outlet port radially extend from the inner chamber.

13. The arrangement for cooling the temperature of a source of air prior to introduction into a motor vehicle engine of claim 12, wherein the at least one intake port and the at least one outlet port are disposed on radially opposite sides of the inner chamber.

14. The arrangement for cooling the temperature of a source of air prior to introduction into a motor vehicle engine of claim 9, wherein the air intake side defines a first mounting flange attached to the air intake member.

15. The arrangement for cooling the temperature of a source of air prior to introduction into a motor vehicle engine of claim 14, wherein the air outlet side defines a second flange attached to the air outlet member.

16. The arrangement for cooling the temperature of a source of air prior to introduction into a motor vehicle engine of claim 9, wherein the intercooler core defines a plurality of holes extending in a direction substantially parallel to the axis for providing a water path through the innercooler core.

17. An arrangement for cooling the temperature of a source of air prior to introduction into a motor vehicle engine, the arrangement comprising:

an integrally formed main body portion including a first end adapted to be interconnected with a turbocharger of a motor vehicle and a second end adapted to be interconnected to the engine, the main body portion defining a generally cylindrical opening extending therethrough along an axis, the cylindrical opening being in fluid communication with the first end through at least one intake port and in fluid communication with the second end through at least one outlet port; and a generally cylindrical intercooler core disposed in the cylindrical opening; the intercooler core defining a plurality of holes extending in a direction substantially parallel to the axis for providing a water path through the intercooler core.

18. The arrangement for cooling the temperature of a source of air prior to introduction into a motor vehicle engine of claim 17, wherein the at least one intake port and the at least one outlet port radially extend from the inner chamber.

* * * * *